(12) United States Patent
Lo et al.

(10) Patent No.: US 11,181,769 B2
(45) Date of Patent: Nov. 23, 2021

(54) POLARIZER SUBSTRATE AND DISPLAY PANEL

(71) Applicant: Au Optronics Corporation, Hsinchu (TW)

(72) Inventors: Tsai-Sheng Lo, Hsinchu (TW);
Chih-Chiang Chen, Hsinchu (TW);
Ming-Jui Wang, Hsinchu (TW);
Sheng-Kai Lin, Hsinchu (TW);
Sheng-Ming Huang, Hsinchu (TW);
Chia-Hsin Chung, Hsinchu (TW);
Hui-Ku Chang, Hsinchu (TW);
Wei-Chi Wang, Hsinchu (TW);
Jen-Kuei Lu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 281 days.

(21) Appl. No.: 16/407,192

(22) Filed: May 9, 2019

(65) Prior Publication Data

US 2020/0133061 A1  Apr. 30, 2020

(30) Foreign Application Priority Data

Oct. 26, 2018 (TW) ................. 107137964

(51) Int. Cl.
*G02F 1/1335* (2006.01)
*G02F 1/1333* (2006.01)

(52) U.S. Cl.
CPC .. *G02F 1/133528* (2013.01); *G02F 1/133514* (2013.01); *G02F 1/133357* (2021.01); *G02F 1/133519* (2021.01); *G02F 1/133548* (2021.01)

(58) Field of Classification Search
CPC ......... G02F 1/133528; G02F 1/133514; G02F 1/133357; G02F 1/133519; G02F 1/133548; G02F 2202/32; G02B 5/305; G02B 1/005
See application file for complete search history.

(56) References Cited

U.S. PATENT DOCUMENTS

| | | | | |
|---|---|---|---|---|
| 6,122,103 | A | * | 9/2000 | Perkins ............... G02B 5/3058 359/485.03 |
| 7,158,302 | B2 | | 1/2007 | Chiu et al. |
| 7,813,039 | B2 | | 10/2010 | Perkins et al. |
| 2005/0277063 | A1 | * | 12/2005 | Wang .................. G02B 5/3025 430/311 |
| 2009/0268295 | A1 | * | 10/2009 | Miller ..................... G02B 1/11 359/576 |
| 2019/0094435 | A1 | | 3/2019 | Shen et al. |

FOREIGN PATENT DOCUMENTS

| | | |
|---|---|---|
| CN | 1231772 | 12/2005 |
| CN | 107942571 | 4/2018 |
| TW | I641878 | 11/2018 |

\* cited by examiner

*Primary Examiner* — Mustak Choudhury
(74) *Attorney, Agent, or Firm* — JCIPRNET

(57) ABSTRACT

A polarizer substrate includes a substrate, an organic planarization layer, an inorganic buffer layer, and a plurality of strip-shaped polarizer structures. The organic planarization layer is located on the substrate. The inorganic buffer layer is located on the organic planarization layer. The inorganic buffer layer has a plurality of trenches located on a first surface. The trenches do not penetrate through the inorganic buffer layer. The strip-shaped polarizer structures are located on the first surface of the inorganic buffer layer. Each of the trenches is located between two adjacent polarizer structures. A display panel is also provided.

20 Claims, 10 Drawing Sheets

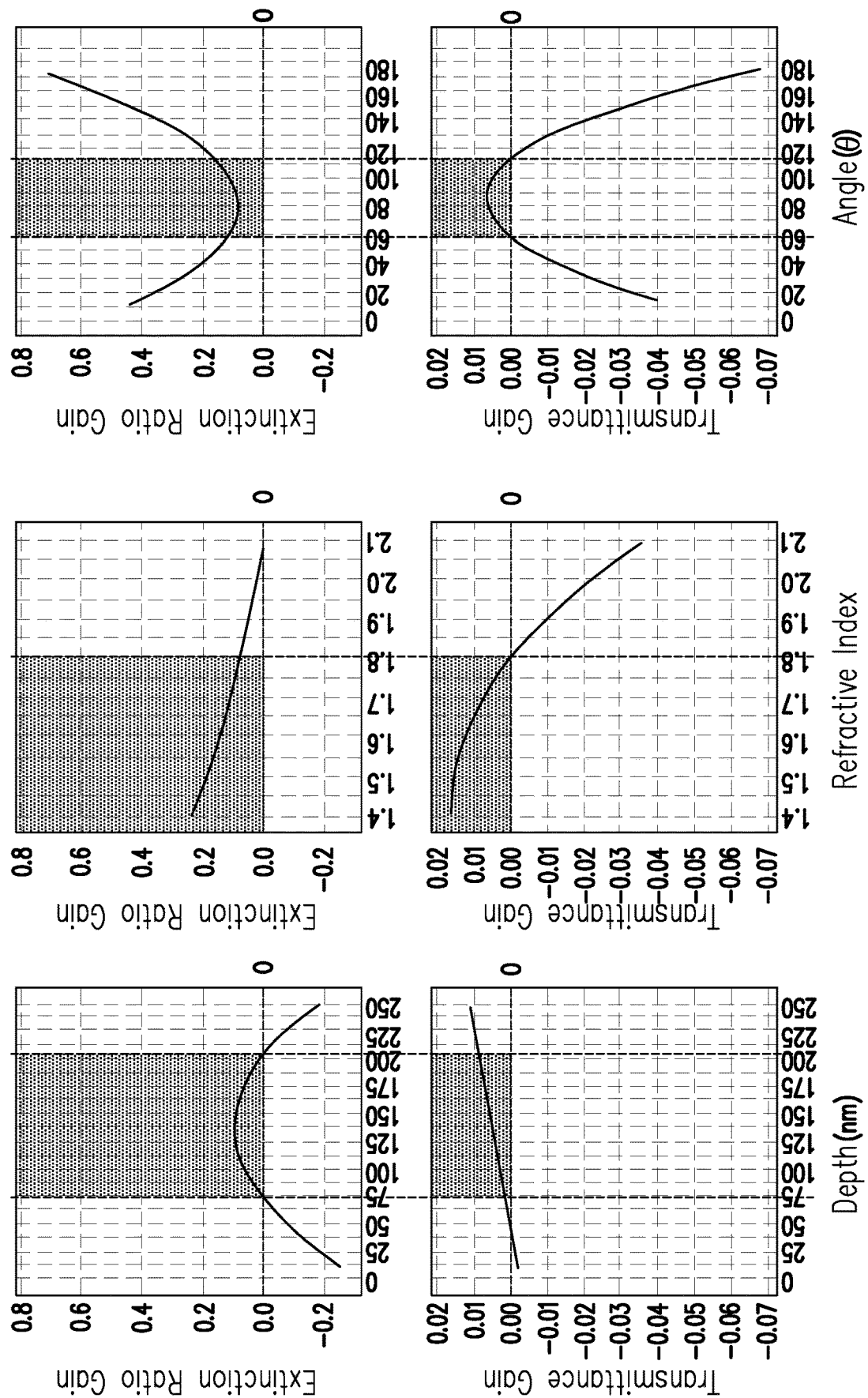

POLARIZER SUBSTRATE AND DISPLAY PANEL

CROSS-REFERENCE TO RELATED APPLICATION

This application claims the priority benefit of Taiwan application serial no. 107137964, filed on Oct. 26, 2018. The entirety of the above-mentioned patent application is hereby incorporated by reference herein and made a part of this specification.

BACKGROUND

Technical Field

The invention relates to a polarizer substrate and a display panel. More particularly, the invention relates to a polarizer substrate having a plurality of strip-shaped polarizer structures and a display panel.

Description of Related Art

In a liquid crystal display panel, polarizer structures are usually disposed on the upper and lower substrates. The direction of the absorption axis of the polarizer structures is determined through the extension direction of the polarizer structures. Since only the light with the polarization direction perpendicular to the absorption axis of the polarizer structures can pass through the polarizer structures, rotation of the liquid crystal between the upper and lower substrates can be used to adjust whether light is allowed to pass through the liquid crystal display panel. Nevertheless, in order to enable the liquid crystal display panel to provide favorable display quality, how to increase the transmittance and extinction ratio of the polarizer structures is an important issue.

SUMMARY

The invention provides a polarizer substrate exhibiting a high transmittance and high extinction ratio.

The invention further provides a display panel has favorable display quality.

At least one embodiment of the invention provides a polarizer substrate. The polarizer substrate includes a substrate, an organic planarization layer, an inorganic buffer layer, and a plurality of strip-shaped polarizer structures. The organic planarization layer is located on the substrate. The inorganic buffer layer is located on the organic planarization layer. The inorganic buffer layer has a plurality of trenches located on a first surface. The trenches do not penetrate through the inorganic buffer layer. The strip-shaped polarizer structures are located on the first surface of the inorganic buffer layer. Each of the trenches is located between two adjacent strip-shaped polarizer structures. The invention further provides a display panel.

At least one embodiment of the invention provides a polarizer substrate. The polarizer substrate includes a substrate, a plurality of strip-shaped polarizer structures, an organic planarization layer, and an active element layer. The substrate has a plurality of trenches located on a second surface. The strip-shaped polarizer structures are located on the second surface of the substrate. Each of the trenches is located between two adjacent strip-shaped polarizer structures. The organic planarization layer is located on the polarizer structures. The active element layer is located on the organic planarization layer.

At least one embodiment of the invention further provides a display panel. The display panel includes a first polarizer substrate, a second polarizer substrate, and a display medium layer. The second polarizer substrate faces the first polarizer substrate. The display medium layer is located between the first polarizer substrate and the second polarizer substrate. The first polarizer substrate includes a first substrate, a first organic planarization layer, an inorganic buffer layer, and a plurality of first strip-shaped polarizer structures. The first organic planarization layer is located on the first substrate. The inorganic buffer layer is located on the first organic planarization layer. The inorganic buffer layer has a plurality of first trenches located on a first surface. The first trenches do not penetrate through the inorganic buffer layer. The first strip-shaped polarizer structures are located on the first surface of the inorganic buffer layer. Each of the first trenches is located between two adjacent first strip-shaped polarizer structures. The second polarizer substrate includes a second substrate, a plurality of second strip-shaped polarizer structures, a second organic planarization layer, and an active element layer. The second substrate has a plurality of second trenches located on a second surface. The second strip-shaped polarizer structures are located on the second surface of the second substrate. Each of the second trenches is located between two adjacent second strip-shaped polarizer structures. The second organic planarization layer is located on the second strip-shaped polarizer structures. The active element layer is located on the organic planarization layer.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2A is a simulation view of transmittance gain and extinction ratio gain of a polarizer substrate having trenches with different depths.

FIG. 2B is a simulation view of transmittance gain and extinction ratio gain of a polarizer substrate having an inorganic buffer layer with different refractive indices.

FIG. 2C is a simulation view of transmittance gain and extinction ratio gain of a polarizer substrate having trenches with different included angles θ.

DESCRIPTION OF THE EMBODIMENTS

FIG. 1A to FIG. 1M are schematic cross-sectional views of a manufacturing method of a polarizer substrate according to an embodiment of the invention.

Figure 1A:
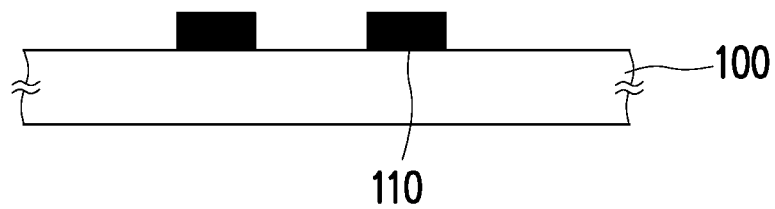
FIG. 1A to FIG. 1M are schematic cross-sectional views of a manufacturing method of a polarizer substrate according to an embodiment of the invention.

With reference to FIG. 1A, black matrix 110 is formed on the substrate 100. A material of the substrate 100 may be glass, quartz, an organic polymer, an opaque/reflective material (e.g., a conductive material, metal, wafer, ceramics, or other suitable materials), or other suitable materials. The black matrix 110 includes a light-shielding material.

Figure 1B:
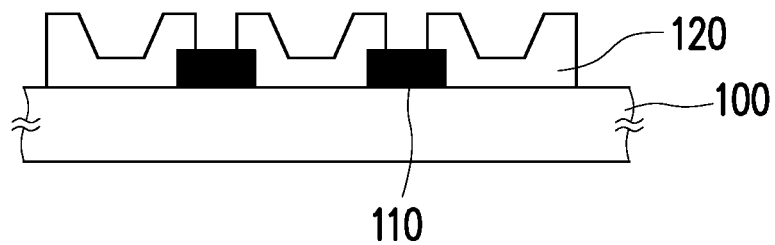

With reference to FIG. 1B, color conversion element 120 is formed on the substrate 100. In some embodiments, the color conversion element 120 includes a plurality of different colors. For instance, the color conversion element 120 includes a red filter element, a green filter element, and a blue filter element, and the black matrix 110 is located among the filter elements of different colors.

Figure 1C:
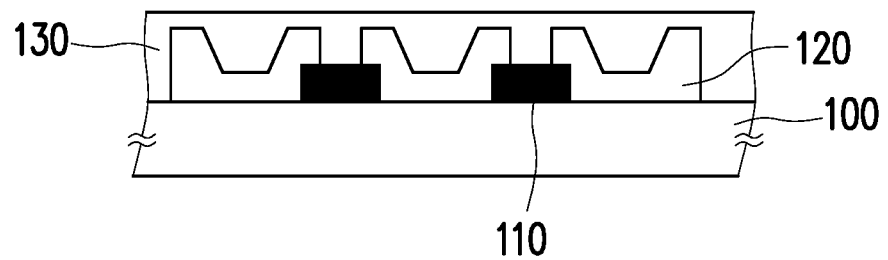

With reference to FIG. 1C, an organic planarization layer 130 is formed on the substrate 100, and the organic planarization layer 130 is located on the substrate 100. In this embodiment, the organic planarization layer 130 is located on the black matrix 110 and the color conversion element 120.

Figure 1D:
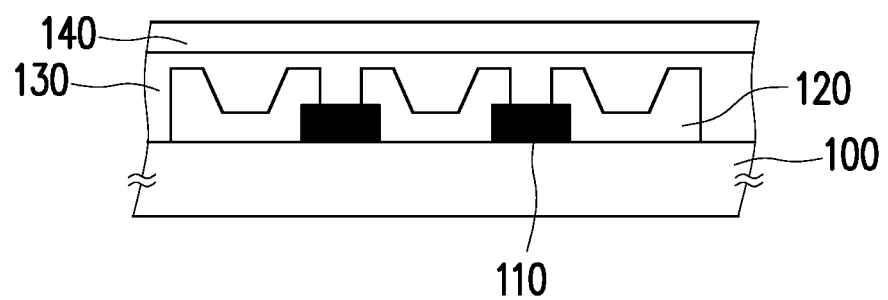

With reference to FIG. 1D, an inorganic buffer layer 140 is formed on the organic planarization layer 130, and the inorganic buffer layer 140 is located on the organic planarization layer 130. In some embodiments, a material of the inorganic buffer layer 140 includes aluminum oxide, magnesium oxide, lanthanum fluoride, silicon oxide, strontium fluoride, magnesium fluoride, sodium fluoride, or a combination of the foregoing materials.

Figure 1E:
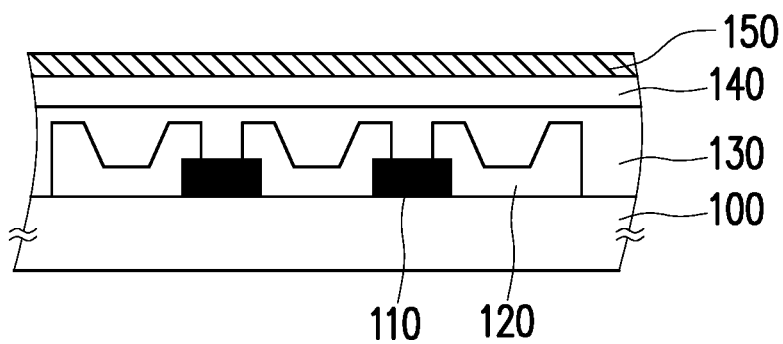

With reference to FIG. 1E, a wire-grid material layer 150 is formed on the inorganic buffer layer 140. The wire-grid material layer 150 is, for example, an inorganic material or an organic material. In some embodiments, the wire-grid material layer 150 is metal (e.g., gold, silver, copper, aluminum, or an alloy of the foregoing metals).

Figure 1F:
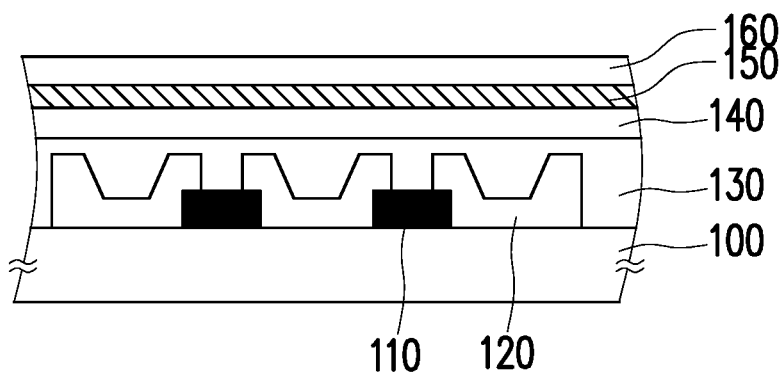

With reference to FIG. 1F, a capping material layer 160 is formed on the wire-grid material layer 150. The capping material layer 160 is, for example, an inorganic material or an organic material. In some embodiments, the capping material layer 160 is an insulation material (e.g., silicon oxide, silicon nitride, silicon oxy-nitride, or other organic or inorganic insulation materials). In some embodiments, other polarizer material layers are formed on the capping material layer 160, but the invention is not limited thereto.

Figure 1G:
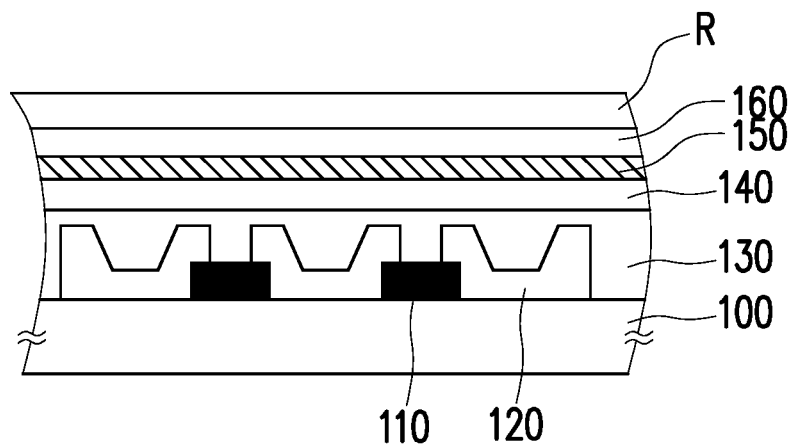
Figure 1H:
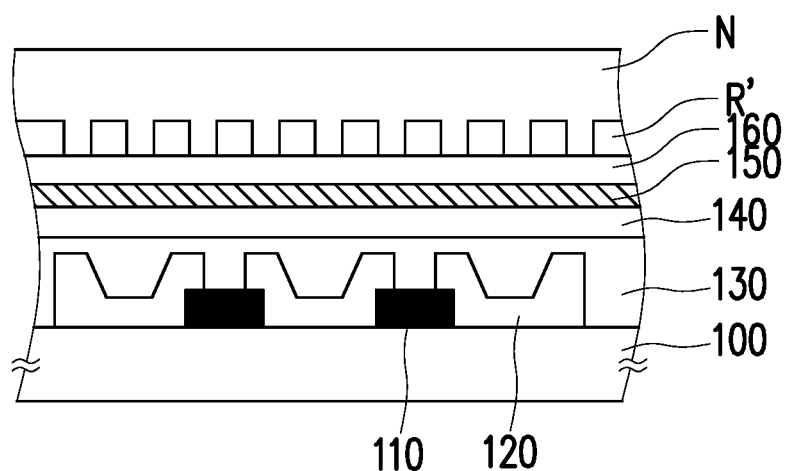
Figure 1I:
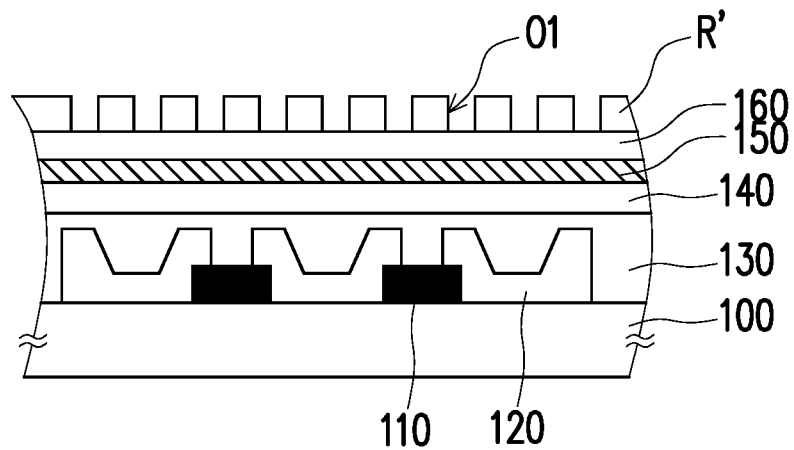

With reference to FIG. 1G to FIG. 1I, a photoresist layer R is formed on the capping material layer 160. A patterned photoresist layer R' is formed through nano-imprint lithography (NIL). For instance, a pressure is applied to the photoresist layer R by a mold N, so that a pattern on the mold N is transferred onto the photoresist layer R, and that the patterned photoresist layer R' including a plurality of openings O1 is formed.

Figure 1J:
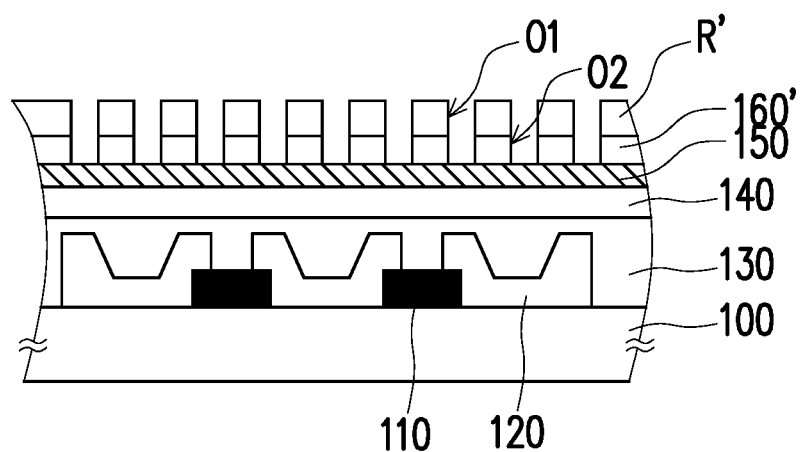

With reference to FIG. 1J, the capping material layer 160 is etched by using the patterned photoresist layer R' as a mask, and that a plurality of capping structures 160' are formed. The capping structure 160' are, for example, strip-shaped (e.g., the inwardly extending strips in FIG. 1I), and an opening O2 is provided between two adjacent capping structures 160'. The openings O2 are substantially aligned with the openings O1, that is, the capping structures 160' are substantially aligned with the patterned photoresist layer R'.

Figure 1K:
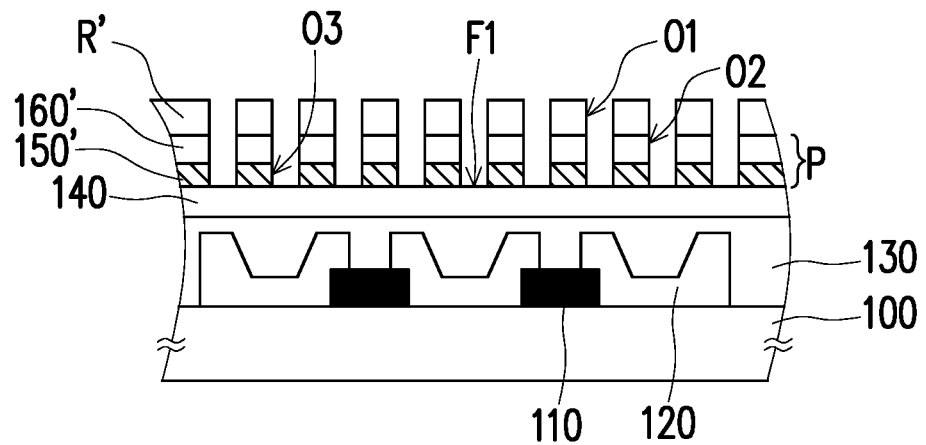

With reference to FIG. 1K, the wire-grid material layer 150 is etched by using the plurality of capping structures 160' and/or the patterned photoresist layer R' as a mask, and that a plurality of wire-grids 150' are formed. The wire-grids 150' are, for example, strip-shaped, and an opening O3 is provided between two adjacent wire-grids 150'. The openings O3 are substantially aligned with the openings O2, that is, the wire-grids 150' are substantially aligned with the capping structures 160'. In this embodiment, the wire-grid material layer 150 is patterned through self-alignment, so that fewer masks are required to be used.

In this embodiment, a strip-shaped polarizer structure P includes the wire-grid 150' and the capping structure 160' stacked together. A plurality of strip-shaped polarizer structures P are located on a first surface F1 of the inorganic buffer layer. In this embodiment, the strip-shaped polarizer structures P are two-layer structures, but the invention is not limited thereto. In other embodiments, the strip-shaped polarizer structures P may be single-layer structures or structures having three or more layers.

The inorganic buffer layer 140 is sandwiched between the strip-shaped polarizer structures P and the organic planarization layer 130, and thereby, when the strip-shaped polarizer structures P are formed, a surface of the organic planarization layer 130 is not deformed when affected by etching, and that the polarizer structures P are prevented from collapsing during a manufacturing process.

Figure 1L:
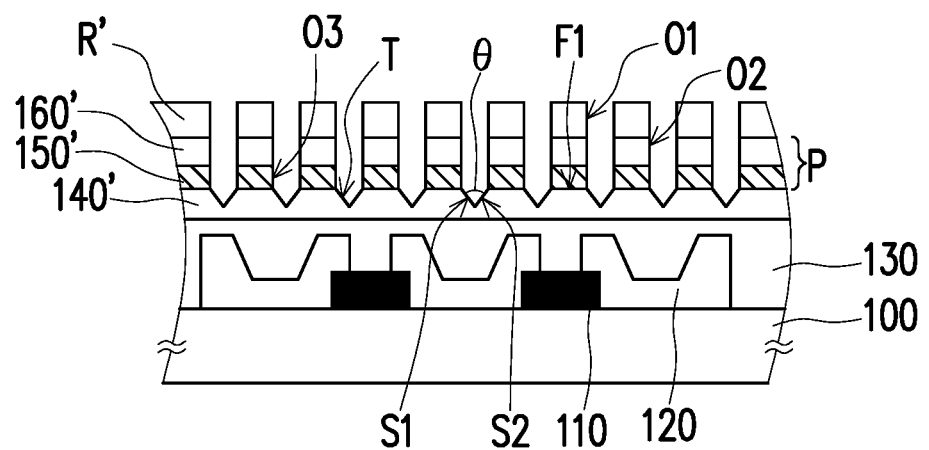

With reference to FIG. 1L, the inorganic buffer layer 140 is etched by using the strip-shaped polarizer structures P and/or the patterned photoresist layer R' as a mask, and that an inorganic buffer layer 140' is formed. The inorganic buffer layer 140' has a plurality of trenches T located on the first surface F1. The trenches T do not penetrate through the inorganic buffer layer 140'. The trenches T are, for example, strip-shaped and have an extending direction identical to an extending direction of the strip-shaped polarizer structures P. Each of the trenches T is located between two adjacent strip-shaped polarizer structures P. The trenches T are substantially aligned with the openings O3. In this embodiment, the trenches T of the inorganic buffer layer 140' are formed through self-alignment, so that fewer masks are required to be used.

In this embodiment, each of the trenches T includes a first side wall S1 and a second side wall S2. The first side wall S1 is connected to the first surface F1. The second side wall S2 is connected to the first surface F1 and the first side wall S1. An included angle θ is provided between the first side wall S1 and the second side wall S2.

Figure 1M:
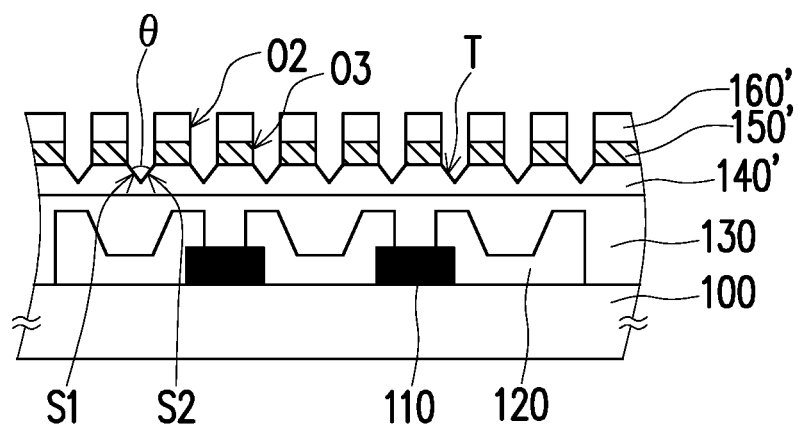

With reference to FIG. 1M, the patterned photoresist layer R' is removed. In this embodiment, the polarizer substrate 10 is a color conversion element substrate, and the polarizer substrate 10 also includes the black matrix 110 and the color conversion element 120, but the invention is not limited thereto.

FIG. 2A is a simulation view of transmittance gain and extinction ratio gain of a polarizer substrate having trenches with different depths. FIG. 2B is a simulation view of transmittance gain and extinction ratio gain of a polarizer substrate having an inorganic buffer layer with different refractive indices. FIG. 2C is a simulation view of transmittance gain and extinction ratio gain of a polarizer substrate having trenches with different included angles θ. The definition of the extinction ratio is the ratio of the transmittance of the transverse magnetic (TM) light/transmittance of the transverse electric (TE) light.

With reference to FIG. 1M and FIG. 2A to FIG. 2C, a polarizer substrate without an inorganic buffer layer (the transmittance gain and the extinction ratio gain are 0) acts as a benchmark, and when a depth of the trenches T is approximately 75 nm to 200 nm, the polarizer substrate 10 has a favorable transmittance gain and extinction ratio gain. In other words, when the depth of the trenches T of the polarizer substrate 10 is approximately 75 nm to 200 nm, the transmittance and extinction ratio of the polarizer substrate 10 may be increased.

When a refractive index of the inorganic buffer layer 140' is less than 1.8, the polarizer substrate 10 has a favorable transmittance gain and extinction ratio gain. In other words, when the refractive index of the inorganic buffer layer 140' of the polarizer substrate 10 is less than 1.8, the transmittance and extinction ratio of the polarizer substrate 10 may be increased.

When the included angle θ of the trenches T is approximately 60 degrees to 110 degrees, the polarizer substrate 10 has a favorable transmittance gain and extinction ratio gain. In other words, when the included angles between the first side walls S1 and the second side walls S2 of the trenches T are 60 degrees to 110 degrees, the transmittance and extinction ratio of the polarizer substrate 10 may be increased.

The one-dimensional photonic crystal trenches T may be formed on the inorganic buffer layer 140' through etching, and in this way, the TM light and the TE light generate different refractive indices in the inorganic buffer layer 140', so that the transmission of the TM light is further raised (transmittance increases), and TE light leakage is contained (extinction ratio increases).

Figure 3:
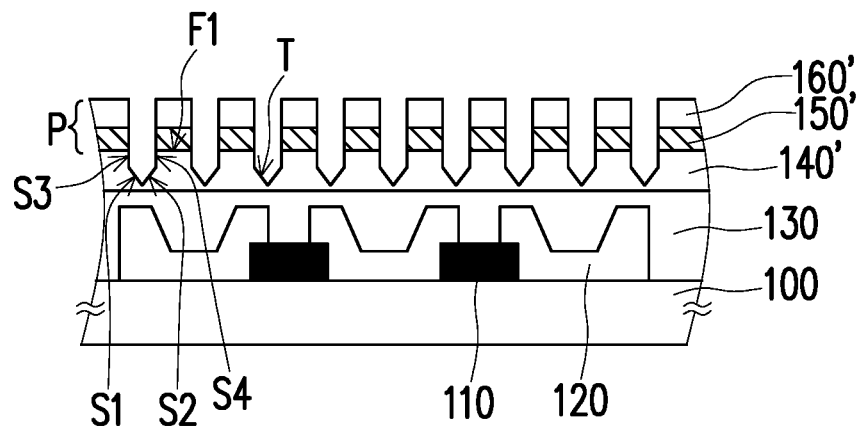
FIG. 3 is a schematic cross-sectional view of a polarizer substrate according to an embodiment of the invention.

FIG. 3 is a schematic cross-sectional view of a polarizer substrate according to an embodiment of the invention. It should be noted that the reference numerals and part of the content of the embodiment of FIG. 1A to FIG. 1M are also used to describe the embodiment of FIG. 3, in which identical or similar reference numerals are used to represent identical or similar elements, and descriptions of the same technical content are omitted. Please refer to the descriptions of the previous embodiments for the omitted part, which will not be repeated hereinafter.

A difference between a polarizer substrate 20 of FIG. 3 and the polarizer substrate 10 of FIG. 1M is that: the shape of the trenches T of the polarizer substrate 20 and the shape of the trenches T of the polarizer substrate 10 are different.

With reference to FIG. 3, each of the trenches T includes the first side wall S1, the second side wall S2, a third side wall S3, and a fourth side wall S4. The third side wall S3 is connected to the first surface F1. The fourth side wall S4 is connected to the first surface F1 and is substantially parallel to the third side wall S3. The first side wall S1 is connected to the third side wall S3. The second side wall S2 is connected to the first side wall S1 and the fourth side wall S4.

In this embodiment, each of the trenches T is formed through, for example, two-stage etching. Specifically, the third side wall S3 and the fourth side wall S4 substantially parallel to each other are formed through first-time etching, and the first side wall S1 and the second side wall S2 are formed through second-time etching. The first-time etching and the second-time etching may produce different etching results when different etching parameters are used.

The polarizer substrate 10 of FIG. 1M has a more favorable transmittance and extinction ratio compared to the polarizer substrate 20 of FIG. 3, and the etching process used to form the trenches T of the polarizer substrate 10 is easier compared to that used to form the trenches T of the polarizer substrate 20.

Figure 4:
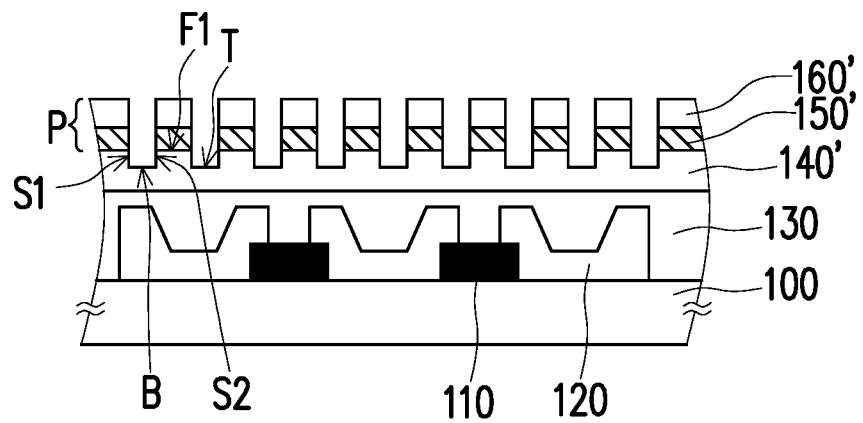
FIG. 4 is a schematic cross-sectional view of a polarizer substrate according to an embodiment of the invention.

FIG. 4 is a schematic cross-sectional view of a polarizer substrate according to an embodiment of the invention. It should be noted that the reference numerals and part of the content of the embodiment of FIG. 1A to FIG. 1M are also used to describe the embodiment of FIG. 4, in which identical or similar reference numerals are used to represent identical or similar elements, and descriptions of the same technical content are omitted. Please refer to the descriptions of the previous embodiments for the omitted part, which will not be repeated hereinafter.

A difference between a polarizer substrate 30 of FIG. 4 and the polarizer substrate 10 of FIG. 1M is that: the shape of the trenches T of the polarizer substrate 30 and the shape of the trenches T of the polarizer substrate 10 are different.

With reference to FIG. 4, each of the trenches T includes the first side wall S1, the second side wall S2, and a bottom surface B. The first side wall S1 is connected to the first surface F1. The second side wall S2 is connected to the first surface F1 and is substantially parallel to the first side wall S1. The bottom surface B is connected to the first side wall S1 and the second side wall S2.

The polarizer substrate 10 of FIG. 1M has a more favorable transmittance and extinction ratio compared to the polarizer substrate 30 of FIG. 4.

Figure 5:
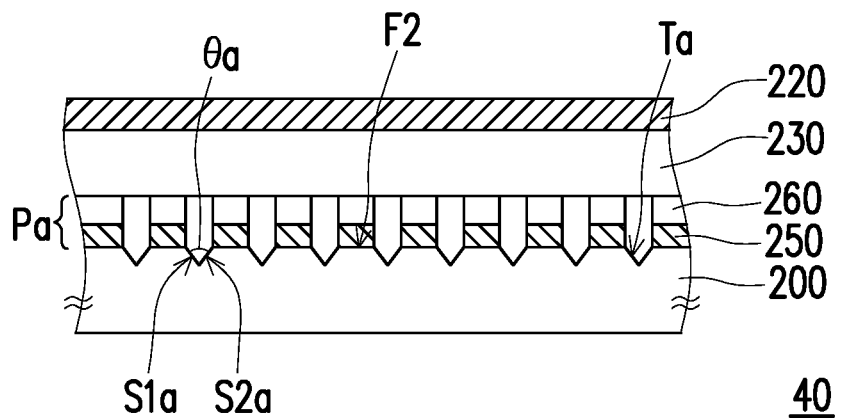
FIG. 5 is a schematic cross-sectional view of a polarizer substrate according to an embodiment of the invention.

FIG. 5 is a schematic cross-sectional view of a polarizer substrate according to an embodiment of the invention. It should be noted that the reference numerals and part of the content of the embodiment of FIG. 1A to FIG. 1M are also used to describe the embodiment of FIG. 5, in which identical or similar reference numerals are used to represent identical or similar elements, and descriptions of the same technical content are omitted. Please refer to the descriptions of the previous embodiments for the omitted part, which will not be repeated hereinafter.

A difference between a polarizer substrate 40 of FIG. 5 and the polarizer substrate 10 of FIG. 1M is that: a substrate 200 of the polarizer substrate 40 has a plurality of trenches Ta located on a second surface F2.

The polarizer substrate 40 includes the substrate 200, a plurality of strip-shaped polarizer structures Pa, an organic planarization layer 230, and an active element layer 220. The substrate 200 has a plurality of trenches Ta located on the second surface F2. The strip-shaped polarizer structures Pa are located on the second surface F2 of the substrate 200. Each of the trenches Ta is located between two adjacent strip-shaped polarizer structures Pa. The organic planarization layer 230 is located on the strip-shaped polarizer structures Pa. The active element layer 220 is located on the organic planarization layer 230.

In this embodiment, the strip-shaped polarizer structures Pa may be double-layer structures including wire-grids 250 and capping structures 260 stacked together, but the invention is not limited thereto. In other embodiments, the strip-shaped polarizer structures Pa may be single-layer structures or structures having three or more layers.

In this embodiment, the organic planarization layer 230 is not filled in gaps among the strip-shaped polarizer structures Pa, and the extinction ratio is increased in this way, but the invention is not limited thereto. In other embodiments, the organic planarization layer 230 is filled in the gaps among the strip-shaped polarizer structures Pa.

In this embodiment, the polarizer substrate 40 is, for example, a pixel array substrate, and the active element layer 220 includes a plurality of pixel structures, but the invention is not limited thereto.

In some embodiments, a refractive index of the substrate 200 is less than 1.8. In some embodiments, each of the trenches Ta includes a first side wall S1$a$ and a second side wall S2$a$, and an included angle θ$a$ between the first side wall S1$a$ and the second side wall S2$a$ of each of the trenches Ta is 60 degrees to 110 degrees. In some embodiments, a depth of the trenches Ta is approximately 75 nm to 200 nm.

As described above, the trenches Ta with one-dimensional photonic crystal structures are formed on the substrate 200, and in this way, the substrate 200 has different refractive indices in the TM light and the TE light generate, so that the transmission of the TM light is further raised (transmittance increases), and TE light leakage is contained (extinction ratio increases).

Figure 6:
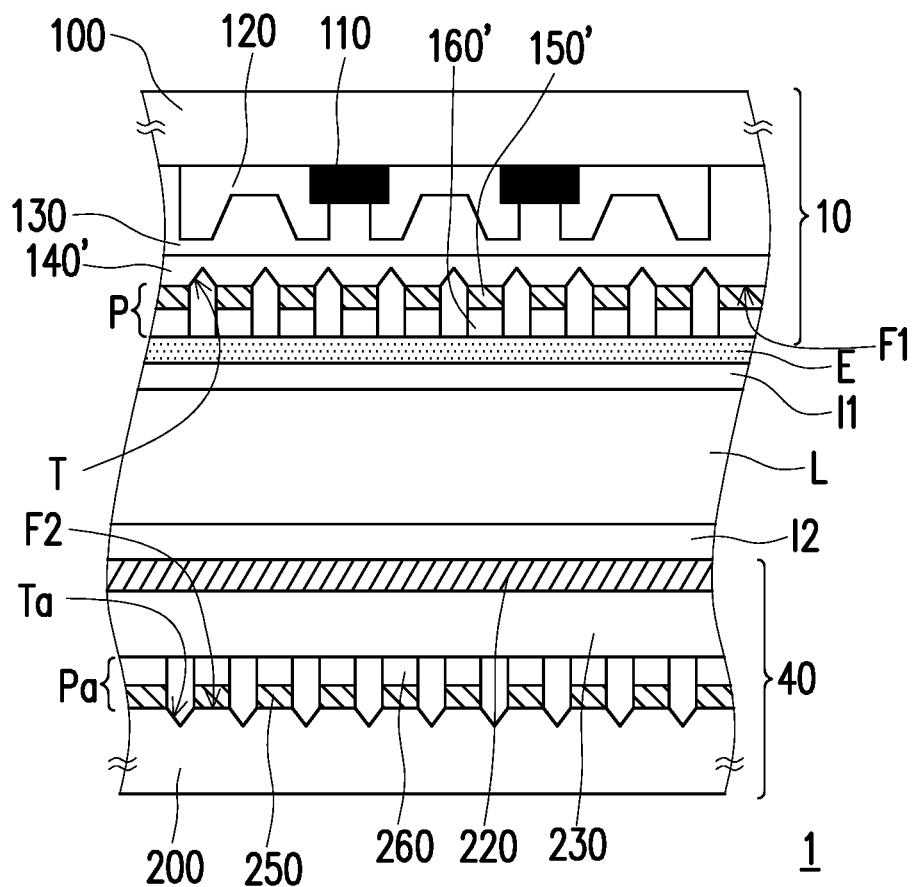
FIG. 6 is a schematic cross-sectional view of a display panel according to an embodiment of the invention.

FIG. 6 is a schematic cross-sectional view of a display panel according to an embodiment of the invention. It should be noted that the reference numerals and part of the content of the embodiment of FIG. 1A to FIG. 1M and FIG. 5 are also used to describe the embodiment of FIG. 6, in which identical or similar reference numerals are used to represent identical or similar elements, and descriptions of the same technical content are omitted. Please refer to the descriptions of the previous embodiments for the omitted part, which will not be repeated hereinafter.

With reference to FIG. 6, a display panel 1 includes the polarizer substrate 10 (a first polarizer substrate), the polarizer substrate 40 (a second polarizer substrate), and a display medium layer L. The polarizer substrate 40 faces the polarizer substrate 10. The display medium layer L is located between the polarizer substrate 10 and the polarizer substrate 40.

The polarizer substrate 10 includes the substrate 100 (a first substrate), the organic planarization layer 130 (a first organic planarization layer), the inorganic buffer layer 140', and the plurality of strip-shaped polarizer structures P (first strip-shaped polarizer structures). The organic planarization layer 130 is located on the substrate 100. The inorganic buffer layer 140' is located on the organic planarization layer 130. The inorganic buffer layer 140' has the plurality of trenches T (first trenches) located on the first surface F1. The trenches T do not penetrate through the inorganic buffer layer 140'. The polarizer structures P are located on the first surface F1 of the inorganic buffer layer 140'. Each of the trenches T is located between two adjacent strip-shaped polarizer structures P.

The polarizer substrate 40 includes the substrate 200 (a second substrate), the plurality of strip-shaped polarizer structures Pa (second strip-shaped polarizer structures), the organic planarization layer 230 (a second organic planarization layer), and the active element layer 220. The substrate 200 has the plurality of trenches Ta (second trenches) located on the second surface F2. The strip-shaped polarizer structures Pa are located on the second surface F2 of the substrate 200. Each of the trenches Ta is located between two adjacent strip-shaped polarizer structures Pa. The organic planarization layer 230 is located on the polarizer structures Pa. The active element layer 220 is located on the organic planarization layer 230.

In this embodiment, the polarizer substrate 10 is a color conversion element substrate, and the polarizer substrate 10 also includes the black matrix 110 and the color conversion element 120. In this embodiment, the polarizer substrate 40 is, for example, a pixel array substrate, and the active element layer 220 includes a plurality of pixel structures.

In this embodiment, an alignment layer I1 is sandwiched between the polarizer substrate 10 and the display medium layer L, and an alignment layer 12 is sandwiched between the polarizer substrate 40 and the display medium layer L.

In this embodiment, an electrode layer E is further sandwiched between the polarizer substrate 10 and the alignment layer I1, but the invention is not limited thereto. The electrode layer E includes, for example, a transparent conductive material.

In some embodiments, through the structural design of the trenches Ta and/or trenches T, the R/G/B chromaticity coordinates may be changed, so that the displayed colors of the display panel may obtain gains in an NTSC region.

In view of the foregoing, in at least one embodiment of the invention, the trenches with one-dimensional photonic crystal structures are formed on the inorganic buffer layer, and in this way, the TM light and the TE light generate different refractive indices in the inorganic buffer layer, so that the transmission of the TM light is further raised (transmittance increases), and the TE light leakage is contained (extinction ratio increases). In addition, in at least one embodiment of the invention, the one-dimensional photonic crystal trenches are formed on the substrate, and in this way, the substrate has different refractive indices in the TM light and the TE light, so that the transmission of the TM light is further raised (transmittance increases), and the TE light leakage is contained (extinction ratio increases).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A polarizer substrate, comprising:
   a substrate;
   an organic planarization layer, located on the substrate;
   an inorganic buffer layer, located on the organic planarization layer, wherein the inorganic buffer layer has a plurality of trenches located on a first surface, and the plurality of trenches do not penetrate through a second surface of the inorganic buffer layer, wherein the second surface of the inorganic buffer layer is opposite to the first surface of the inorganic buffer layer, and the first surface of the inorganic buffer layer is farther away from the substrate than the second surface of the inorganic buffer layer; and
   a plurality of strip-shaped polarizer structures, located on the first surface of the inorganic buffer layer, wherein each of the trenches is located between two adjacent strip-shaped polarizer structures.

2. The polarizer substrate as claimed in claim 1, wherein each of the trenches comprises:
   a first side wall, connected to the first surface of the inorganic buffer layer; and
   a second side wall, connected to the first surface of the inorganic buffer layer and the first side wall.

3. The polarizer substrate as claimed in claim 2, wherein an included angle between the first side wall and the second side wall is 60 degrees to 110 degrees.

4. The polarizer substrate as claimed in claim 1, wherein each of the trenches comprises:
   a third side wall, connected to the first surface of the inorganic buffer layer;
   a fourth side wall, connected to the first surface of the inorganic buffer layer, substantially parallel to the third side wall;
   a first side wall, connected to the third side wall; and
   a second side wall, connected to the first side wall and the fourth side wall.

5. The polarizer substrate as claimed in claim 1, wherein each of the trenches comprises:
   a first side wall, connected to the first surface of the inorganic buffer layer;

a second side wall, connected to the first surface of the inorganic buffer layer, substantially parallel to the first side wall; and a bottom surface, connected to the first side wall and the second side wall.

6. The polarizer substrate as claimed in claim 1, wherein a refractive index of the inorganic buffer layer is less than 1.8.

7. The polarizer substrate as claimed in claim 1, wherein a depth of the trenches is 75 nm to 200 nm.

8. The polarizer substrate as claimed in claim 1, wherein a material of the inorganic buffer layer comprises aluminum oxide, magnesium oxide, lanthanum trifluoride, silicon oxide, strontium fluoride, magnesium fluoride, sodium fluoride, or a combination of the foregoing materials.

9. A polarizer substrate, comprising:
a second substrate, the second substrate having a first surface and a second surface opposite to the first surface, wherein the second substrate has a plurality of trenches located on the second surface;
a plurality of strip-shaped polarizer structures, located on the second surface of the second substrate, wherein each of the trenches is located between two adjacent strip-shaped polarizer structures;
an organic planarization layer, located on the plurality of strip-shaped polarizer structures, wherein the organic planarization layer is in contact with a surface of the plurality of strip-shaped polarizer structures, and the organic planarization layer is separated from the second substrate; and
an active element layer, located on the organic planarization layer.

10. The polarizer substrate as claimed in claim 9, wherein each of the trenches comprises:
a first side wall, connected to the second surface; and
a second side wall, connected to the second surface and the first side wall.

11. The polarizer substrate as claimed in claim 10, wherein an included angle between the first side wall and the second side wall is 60 degrees to 110 degrees.

12. The polarizer substrate as claimed in claim 9, wherein a refractive index of the second substrate is less than 1.8.

13. A display panel, comprising:
a first polarizer substrate, comprising:
a first substrate;
a first organic planarization layer, located on the first substrate;
an inorganic buffer layer, located on the first organic planarization layer, wherein the inorganic buffer layer has a plurality of first trenches located on a first surface, and the first trenches do not penetrate through a second surface of the inorganic buffer layer, wherein the second surface of the inorganic buffer layer is opposite to the first surface of the inorganic buffer layer, and the first surface of the inorganic buffer layer is farther away from the substrate than the second surface of the inorganic buffer layer; and
a plurality of first strip-shaped polarizer structures, located on the first surface of the inorganic buffer layer, wherein each of the first trenches is located between two adjacent first strip-shaped polarizer structures;
a second polarizer substrate, facing the first polarizer substrate, the second polarizer substrate comprising:
a second substrate, the second substrate having a plurality of second trenches located on a third surface;
a plurality of strip-shaped second polarizer structures, located on the third surface of the second substrate, wherein each of the second trenches is located between two adjacent second strip-shaped polarizer structures;
a second organic planarization layer, located on the plurality of second strip-shaped polarizer structures; and
an active element layer, located on one of the first substrate or the second substrate; and
a display medium layer, located between the first polarizer substrate and the second polarizer substrate.

14. The display panel as claimed in claim 13, wherein each of the first trenches comprises:
a first side wall, connected to the first surface of the inorganic buffer layer; and
a second side wall, connected to the first surface of the inorganic buffer layer and the first side wall.

15. The display panel as claimed in claim 14, wherein an included angle between the first side wall and the second side wall is 60 degrees to 110 degrees.

16. The display panel as claimed in claim 13, wherein each of the first trenches comprises:
a third side wall, connected to the first surface of the inorganic buffer layer;
a fourth side wall, connected to the first surface of the inorganic buffer layer, substantially parallel to the third side wall;
a first side wall, connected to the third side wall; and
a second side wall, connected to the first side wall and the fourth side wall.

17. The display panel as claimed in claim 13, wherein each of the first trenches comprises:
a first side wall, connected to the first surface of the inorganic buffer layer;
a second side wall, connected to the first surface of the inorganic buffer layer, substantially parallel to the first side wall; and
a bottom surface, connected to the first side wall and the second side wall.

18. The display panel as claimed in claim 13, wherein one of a refractive index of the inorganic buffer layer and a refractive index of the second substrate are less than 1.8.

19. The display panel as claimed in claim 13, wherein each of the second trenches comprises:
a first side wall, connected to the third surface of the second substrate; and
a second side wall, connected to the third surface of the second substrate and the first side wall.

20. The display panel as claimed in claim 19, wherein an included angle between the first side wall and the second side wall is 60 degrees to 110 degrees.

* * * * *